(12) United States Patent
Olston et al.

(10) Patent No.: US 7,921,103 B2
(45) Date of Patent: Apr. 5, 2011

(54) ADAPTIVE MATERIALIZED VIEW SELECTION FOR DATABASES

(75) Inventors: Chris Olston, Mountain View, CA (US); Jayavel Shanmugasundaram, Santa Clara, CA (US); Sandeep Pandey, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 468 days.

(21) Appl. No.: 12/143,710

(22) Filed: Jun. 20, 2008

(65) Prior Publication Data

US 2009/0319476 A1 Dec. 24, 2009

(51) Int. Cl.
*G06F 17/00* (2006.01)
(52) U.S. Cl. .................. 707/717; 707/693; 707/719
(58) Field of Classification Search .......... 707/693, 707/717, 719
See application file for complete search history.

(56) References Cited

U.S. PATENT DOCUMENTS

| | | | |
|---|---|---|---|
| 5,897,632 A * | 4/1999 | Dar et al. | 1/1 |
| 6,026,390 A * | 2/2000 | Ross et al. | 1/1 |
| 6,366,903 B1 * | 4/2002 | Agrawal et al. | 1/1 |
| 6,496,819 B1 * | 12/2002 | Bello et al. | 1/1 |
| 7,111,020 B1 * | 9/2006 | Gupta et al. | 1/1 |
| 2003/0093415 A1 * | 5/2003 | Larson et al. | 707/3 |
| 2005/0235004 A1 * | 10/2005 | Folkert et al. | 707/201 |
| 2006/0047696 A1 * | 3/2006 | Larson et al. | 707/103 R |
| 2007/0208696 A1 * | 9/2007 | Burger | 707/2 |
| 2009/0177697 A1 * | 7/2009 | Gao et al. | 707/104.1 |
| 2010/0030731 A1 * | 2/2010 | Gui et al. | 707/2 |

OTHER PUBLICATIONS

Jun Liu, Mark Roantree, Zohra Bellahsene; Optimizing XML data with view fragments; Jan. 2010; Proceeding ADC '10 Proceedings of the Twenty-First Australasian Conference on Database Technologies—vol. 104.*
Chaudhuri S., Narasayya V., An Efficient Cost-DrivenIndex Selection Tool for Microsoft SQL Server. VLDB1997.*
S. Agrawal, S. Chaudhuri, and V.R.Narasayya. Automated selection of materialized views and indexes in SQL databases. In Proceedings of VLDB, pp. 496-505, 2000.*
Nan Tang, Jeffrey Xu Yu, Hao Tang, M. Tamer Özsu and Peter Boncz; Materialized View Selection in XML Databases; Lecture Notes in Computer Science, 2009, vol. 5463/2009, 616-630.*

* cited by examiner

*Primary Examiner* — Charles Kim
*Assistant Examiner* — Kurt Mueller
(74) *Attorney, Agent, or Firm* — Hickman Palermo Truong & Becker

(57) ABSTRACT

Techniques described herein adaptively select materialized view fragments for persistent maintenance. During an interval of time, the selected fragments are persistently maintained in the database system, while the other non-selected fragments are not persistently maintained as materialized view fragments. Over time, the composition of the set of selected fragments may change. As queries are executed in the database system over an interval of time, statistics including the frequency of access of each currently selected fragment during that interval are generated. At the start of the next interval of time, based on these statistics, some currently selected fragments may be unselected. Some currently non-selected fragments of one or more candidate materialized views may be selected based on the statistics. For the next interval, the newly unselected fragments cease to be persistently maintained as materialized view fragments, while the newly selected fragments begin to be persistently maintained as materialized view fragments.

22 Claims, 4 Drawing Sheets

ADAPTIVE MATERIALIZED VIEW SELECTION FOR DATABASES

FIELD OF THE INVENTION

The present invention relates to database systems, and, more specifically, to techniques for adaptively selecting which materialized views of data will be maintained in a database system.

BACKGROUND

Data that are operated upon by computing devices may be stored in a database system. In a relational database system, data are logically stored as records in rows of relational tables. Each relational table typically contains one or more columns. For each record, the values of the fields of that record are stored in separate columns of one or more relational tables. For example, a database might contain, among other tables, an "employee" database table that contained columns for "name," "address," "SSN," "birthdate," "department," and "salary" fields. A particular row in the "employee" database table might contain values such as "Bob Smith," "123 Sycamore Street," "132-69-8475," "12/08/1941," "accounting," and "$115,000"—each such value being stored in and corresponding to a separate one of the columns mentioned.

In order to retrieve selected data from one or more relational tables, a user may formulate and submit a query to a database server. The query specifies some criteria by which the database server should select data from among all of the data contained in the database system. For example, the query may specify certain tables and columns. The database server receives and executes the query. In executing the query, the database server forms a result set and returns the result set to the user from whom the query was received. The result set is a selected subset of all of the data in the database system. The result set consists only of the data that satisfied the criteria specified in the query. Often, queries and the criteria indicated therein are specified via a formal query language such as Structured Query Language (SQL).

Some database systems provide a feature called a "materialized view." A result set produced by a query may be thought of as a "view" of selected data in the database system. A result set produced by a query may be stored in a persistent manner for quick access later. A result set that is stored in such a persistent manner, or that is defined by a query that produces the result set, is called a "materialized view." When a result set is stored in a persistent manner, it may be possible, under some circumstances, to avoid re-executing the query that produced that result set every time that the result set needs to be accessed. For example, if the underlying data from which the result set was generated have not changed since the result set was last calculated, or if the only parts of the underlying data that have changed are parts that are irrelevant to the query, then the result set itself will not have changed either. Thus, a "materialized view" is a persistently stored result set that is defined by a query. A materialized view persists even after the data contained therein are displayed or otherwise produced, such that the query defining the materialized view does not need to be re-executed in order to make the data available for later display or other production. In some database systems, materialized views themselves can be queried in the same manner that regular relational tables can be queried.

By defining materialized views in a database system, the re-execution of queries that define those materialized views can often be avoided, thereby conserving processing resources. When the execution of a query can be avoided by making reference to that query's materialized view instead, data access times can be improved as well. However, materialized views consume memory and storage resources. Every computing system's memory and storage resources are finite. Therefore, in every computing system, no matter how massive, there is a limit to the number and size of materialized views that can be concurrently maintained. Although it might be desirable to maintain a very large set of materialized views in order to conserve processing resources and reduce data access times, practical considerations force database system administrators to select, manually, from among a large pool of desired materialized views, a smaller set of materialized views that will be maintained in a database system.

Unfortunately, it can be difficult for a human database system administrator to make such a decision, especially when the quantity of materialized views from which the administrator must choose is very large. Additionally, because the state of the data in a database is often in constant flux, a human database administrator might be tasked with repetitively and frequently choosing new materialized views to maintain and previously maintained materialized view to abandon to make storage space for the newly chosen materialized views. Such a task can be overwhelming. Even if the state of the data in a database is relatively static, the workload sent to the database might shift over time. A change in workload (comprising queries sent to the database over time) often figures into a human database administrator's decision regarding which materialized views should be maintained and which materialized view should be abandoned.

In "Automated selection of materialized views and indexes for SQL databases," by S. Agrawal, S. Chaudhuri, and V. Narasayya (in *Proceedings of the International Conference on Very Large Data Bases*, 2000), an automated materialized view selection approach is discussed. This approach seeks to build a predictive model of various relevant factors and perform a combinatorial search over the model to identify a set of materialized views that does well according to some mathematical objective. Unfortunately, the models may be inaccurate, leading to poor predictions. Additionally, sufficient information about the data underlying the materialized views, and/or about the workload that will be performed relative to the materialized views, is often unavailable, making it difficult to build a good predictive model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

Figure 1:
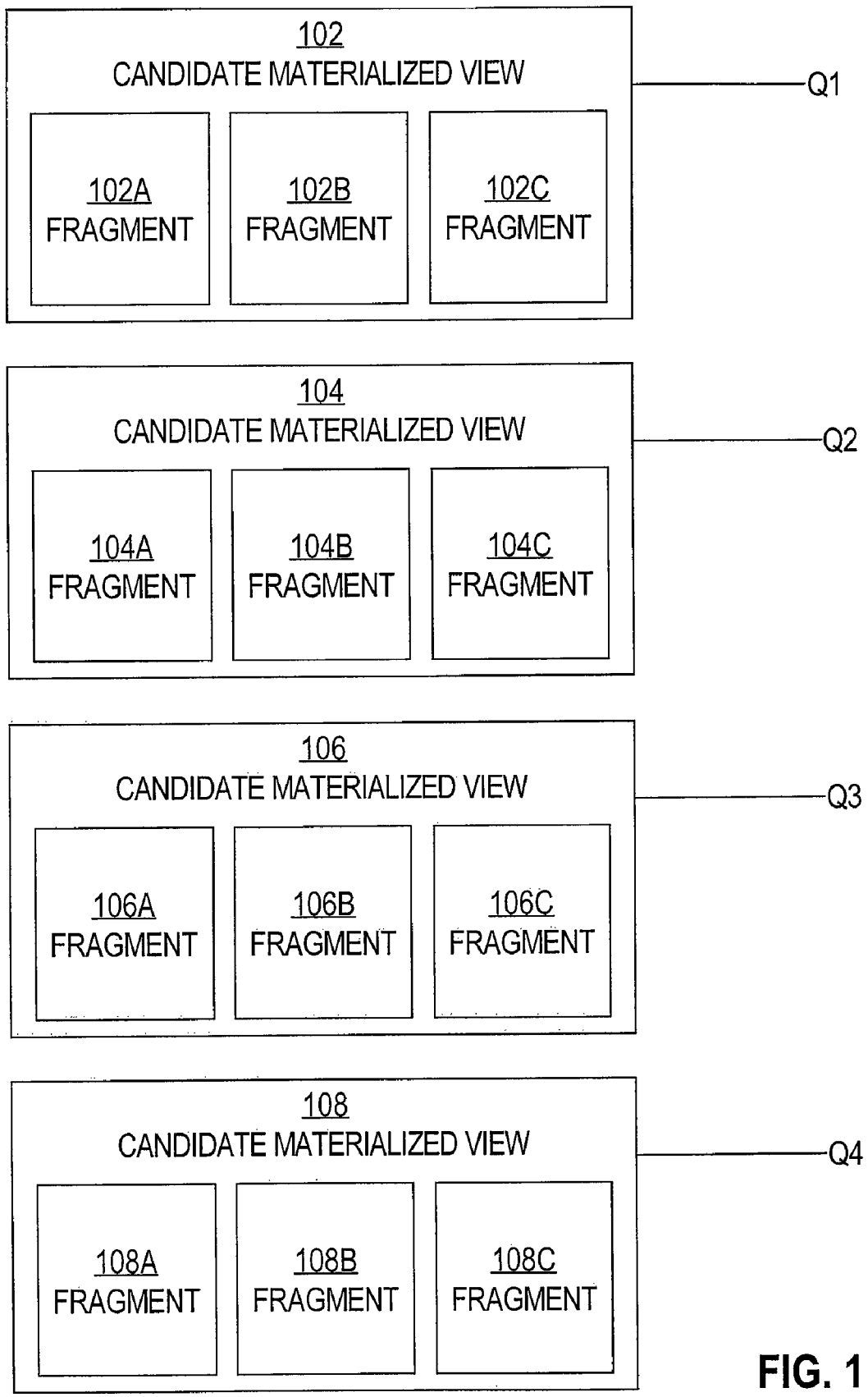
FIG. 1 is a block diagram that illustrates an example of a database that contains multiple fragments, and in which subsets of fragments become selected and unselected for persistent maintenance in the database system over time, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques described herein automatically, adaptively, and continuously select, from a pool of candidate materialized view fragments, for persistent maintenance in a database system, subsets of candidate materialized view fragments in that pool. In one embodiment of the invention, a "fragment" is a subset (less than all of) of the rows of a materialized view. Each selected materialized view fragment in the subset of candidate materialized view fragments is maintained in a persistent manner in the database system for at least some interval of time, while other non-selected materialized view fragments in the pool are not maintained in a persistent manner in the database system during that interval of time. Significantly, fewer than all of the fragments of a particular whole candidate materialized view (comprising multiple fragments) may be selected for persistent maintenance in the database system-some of the fragments of a particular candidate materialized view might be selected, while other fragments of that same particular candidate materialized view might not be selected. Additionally, fragments from multiple different candidate materialized views might be selected. The techniques disclosed herein stand in contrast to hypothetical systems in which a candidate materialized view can only be selected for persistent maintenance either in its entirety or not at all.

During an interval of time, the selected fragments are persistently maintained in the database system, while the other non-selected fragments are not persistently maintained as materialized view fragments (although the underlying data from which those fragments would have been materialized via query execution is still persistently maintained in the database). Each candidate materialized view in the pool of candidate materialized views may correspond to a separate query that gets executed in the database system; for each query, a corresponding candidate materialized view, when actually materialized and persistently maintained, contains the results of executing that query relative to the data in the database. Whenever a query is executed in the database system, any persistently maintained (currently selected) fragments of the candidate materialized view that corresponds to that query are used to generate at least partial results for that query; thus, the query does not need to be executed specifically to generate at least those partial results. For each of the corresponding candidate materialized view's fragments that are not persistently maintained (because they are not currently selected), the query is actually executed relative to the underlying data from which that unmaintained fragment would have been materialized in order to generate the remainder of the results for that query. Some savings in time and processing resources may be obtained by persistently storing at least some materialized view fragments.

Over time, the composition of the set of selected candidate materialized view fragments may change, according to techniques described herein. As queries are executed in the database system over an interval of time, statistics regarding the frequency of access of each currently selected fragment during that interval are generated and measured. Thus, each currently selected fragment is associated with a separate access frequency. Each currently selected fragment's access frequency is used, potentially in combination with other factors regarding that currently selected fragment, to generate a score for that fragment for the current interval of time when the end of the interval has been reached. For each of the pool's candidate materialized views that contains at least one selected fragment, a score for that candidate materialized view, as a whole, is generated based on the scores generated for that materialized view's currently selected candidate fragments. Prior to the beginning of the next interval of time, one or more currently selected fragments of one or more candidate materialized views whose scores are lower than the scores of the other candidate materialized views for the preceding interval of time may be unselected. In conjunction with the unselection of these fragments, one or more currently non-selected fragments of one or more candidate materialized views whose scores are higher than the scores of the other candidate materialized views for the preceding interval of time may be selected. For the next interval of time, the newly unselected fragments cease to be persistently maintained as materialized view fragments (although the underlying data from which those fragments would have been materialized via query execution is still persistently maintained in the database), while the newly selected fragments begin to be persistently maintained as materialized view fragments.

Other features that may be included in various different embodiments of the invention are also discussed in more detail below.

Example Fragmented Data Set

FIG. 1 is a block diagram that illustrates an example of a database that contains multiple fragments, and in which subsets of fragments become selected and unselected for persistent maintenance in the database system over time, according to an embodiment of the invention. Candidate materialized views 102-108 are shown in FIG. 1. Each of candidate materialized views 102-108, when actually materialized and persistently stored, contains a set of results for a different corresponding query in a set of queries Q1-Q4. For example, candidate materialized view 102 corresponds to a query Q1, candidate materialized view 104 corresponds to a query Q2, candidate materialized view 106 corresponds to a query Q3, and candidate materialized view 108 corresponds to a query Q4. Different ones of queries Q1-Q4 may select different subsets of data from a database. For example, if the database records represent web pages that a web crawler discovered on the Internet, then Q1 might be a query that filters out, from all such web pages, web pages that satisfy criteria that cause them to be classified as "spam," so that only "non-spam" web page records are returned as the result of executing query Q1 relative to the database records. Query Q2, on the other hand, might be a query that aggregates values from multiple records and produces an aggregate value based on those values. Queries Q1 and Q2 might be used in conjunction with each other.

In one embodiment of the invention, each of candidate materialized views 102-108, when actually materialized and persistently stored, contains a subset of rows of one or more relational tables in a database system. Each such row might contain data that a web crawler collected for a different web page on the Internet, for example. If Q1 were to be executed, then the rows in candidate materialized view 102 would be returned as query results. If Q2 were to be executed, then the rows in candidate materialized view 104 would be returned as query results. If Q3 were to be executed, then the rows in candidate materialized view 106 would be returned as results. If Q4 were to be executed, then the rows in candidate materialized view 108 would be returned as results.

In one embodiment of the invention, each of candidate materialized views 102-108 comprises two or more fragments. In FIG. 1, candidate materialized view 102 comprises fragments 102A-C, candidate materialized view 104 comprises fragments 104A-C, candidate materialized view 106 comprises fragments 106A-C, and candidate materialized view 108 comprises fragments 108A-C. A fragment of one candidate materialized view may contain one or more rows that are also contained in a fragment of another candidate materialized view.

As is discussed above, in one embodiment of the invention, during a particular time interval, some of the fragments illustrated in FIG. 1 may be currently selected, while others of the fragments illustrated in FIG. 1 may be currently non-selected. In one embodiment of the invention, during a particular time interval, the only fragments that are actually materialized and persistently stored on disk as materialized fragments, such that their constituent rows can be accessed without re-executing the query that corresponds to the candidate materialized view to which those fragments belong, are the fragments that are currently selected. The number of fragments that are currently selected during a particular time interval may depend on (a) the amount of space available on the database's persistent storage devices (e.g., hard disk drives) for storing materialized view fragments, and (b) the size of each materialized view fragment. As more storage space becomes available, the number of fragments that can be concurrently maintained in a persistent state during a particular time interval increases. As the size of the fragments decreases, the number of fragments that can be concurrently maintained in a persistent state during a particular time interval also increases.

Randomly Formed Fragments

In one embodiment of the invention, each of candidate materialized views 102-108 is initially fragmented by choosing a number of fragments into which the candidate materialized view will be divided, and then randomly selecting, for each row of the candidate materialized view, which one of the view's fragments that row will belong. Although each row of a candidate materialized view may be assigned randomly to one of that view's fragments, in one embodiment of the invention, an approximately equal number of rows are assigned to each fragment. Thus, each of a candidate materialized view's fragments contains a random sampling of rows from that candidate materialized view. This fact plays a role in the rate at which the adaptive view selection techniques discussed herein converge. Because each of a candidate materialized view's fragments forms a random partition of the rows in that view, observations and measurements that are accumulated over the actually materialized fragments of that view can be leveraged to learn information about the currently unmaterialized fragments of that same view. This follows from sampling theory—the random construction of each fragment means that each fragment can be thought of as a statistically representative sample of the full view. As a result, informed decisions about whether a particular fragment should or should not be materialized and persistently maintained can be made even if the particular fragment has never actually been materialized previously.

As is discussed above, in one embodiment of the invention, each of a candidate materialized view's fragments is of approximately the same size. Where randomly formed fragments of approximately the same size exist, a natural, robust way of measuring the utility of any particular one of those fragments follows. In one embodiment of the invention, if a query is able to benefit from a particular partially-materialized view, then that query is executed as two sub-queries: one sub-query that reads from the materialized fragments of the particular partially-materialized view, and a second sub-query that cannot use the view (because the fragment from which the second sub-query needs to read has not been materialized) and must read from the raw underlying data—the underlying data from which the unmaterialized fragments would be materialized. Under such circumstances, the second sub-query will be slower than the first sub-query (if normalization by sized is performed). The execution times of the two sub-queries are contrasted. A measurement of how much "utility" (saved execution time) is gained by having the materialized view fragments is determined from this contrasting. In one embodiment of the invention, these measurements are taken relative to many instances-many fragments and many queries. The measurements taken relative to the multiple instances are then averaged to produce a very accurate estimate of the fragments' utility.

Initially Selecting Materialized View Fragments to Maintain

In one embodiment of the invention, materialized views are generated in the database as the queries that generate the result sets that are contained in those materialized views are executed. For example, when query Q1 is executed, materialized view 102 may be generated, and when query Q2 is executed, materialized view 104 may be generated. However, after a materialized view is generated, less than all of the fragments of that materialized view may be maintained in a persistent manner. For example, after materialized view 102 is generated, materialized view fragment 102A might be persistently stored on a hard disk drive, while materialized view fragments 102B and 102C might be discarded (e.g., by being erased from volatile or non-volatile storage) after their use. Similarly, after materialized view 104 is generated, materialized view fragment 104A might be persistently stored on a hard disk drive, while materialized view fragments 104B and 104C might be discarded (e.g., by being erased from volatile or non-volatile storage) after their use.

In one embodiment of the invention, materialized view fragments from various candidate materialized views are initially selected for persistent maintenance in a round-robin manner. In one embodiment of the invention, materialized view fragments are selected for persistent maintenance in a manner that attempts to equalize the number of fragments selected from each candidate materialized view, assuming that the fragments are approximately equal in size. Thus, in a first round, materialized view fragments 102A, 104A, 106A, and 108A might be selected for persistent maintenance and storage in the database—one fragment from each of the candidate materialized views 102-108. After this first round, a determination may be made as to whether sufficient space exists on the persistent storage devices of the database to allow another round of fragment selections to be made. If sufficient space exists, then another, second round of materialized view fragment selections may be made. For example, in a second round, materialized view fragments 102B, 104B, 106B, and 108B might be selected for persistent maintenance and storage in the database-one fragment from each of the candidate materialized views 102-108. The process described above, of selecting a limited quantity of fragments from each materialized view and then determining whether enough storage space remains to select further fragments to be stored persistently, may be repeated until the outcome of the determination is that insufficient storage space remains to persistently store and maintain any more materialized view fragments.

Figure 2:
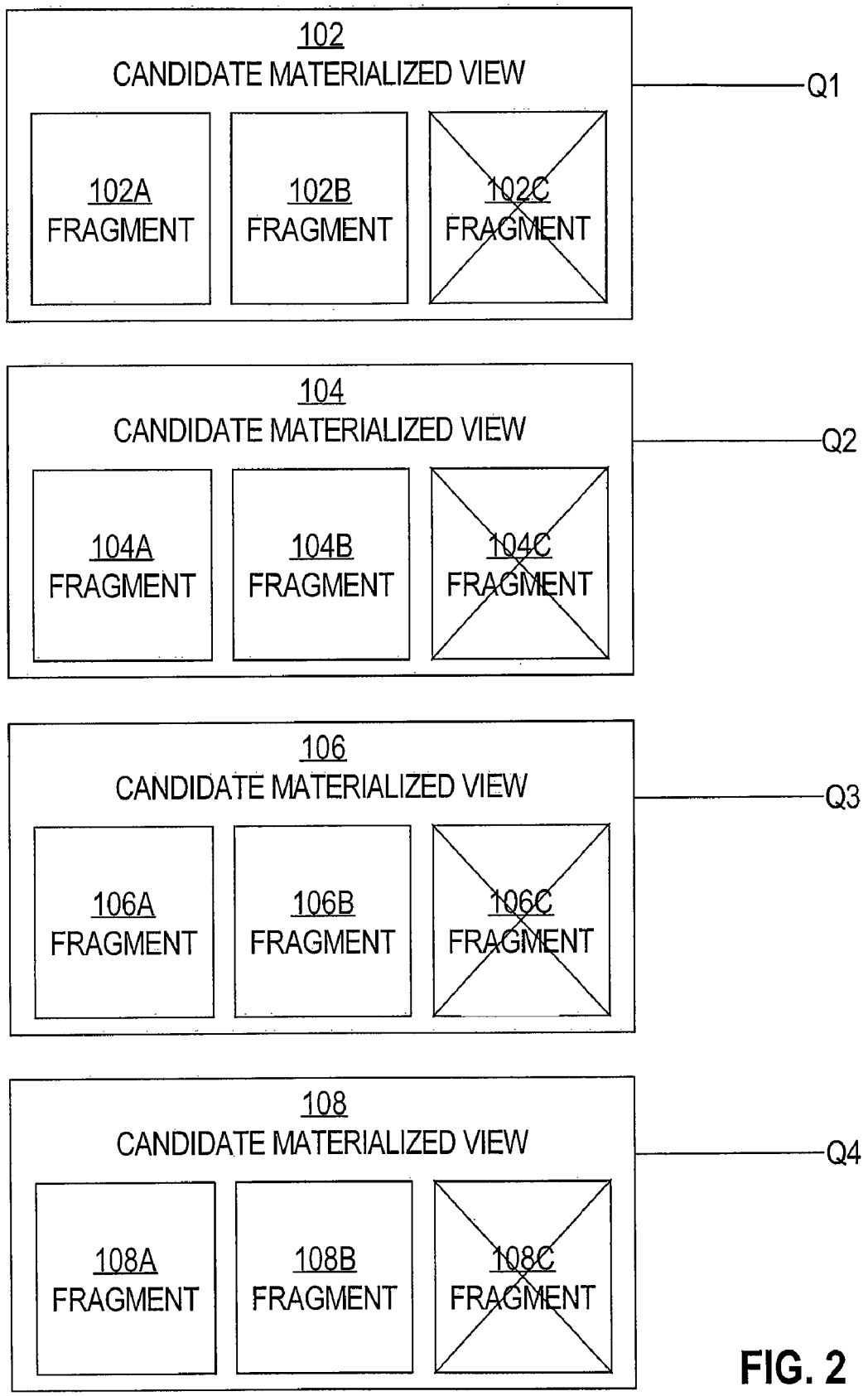
FIG. 2 is a block diagram that illustrates an example of a database in which some materialized view fragments from each candidate materialized view have been initially selected for persistent maintenance, according to an embodiment of the invention.

FIG. 2 is a block diagram that illustrates an example of a database in which some materialized view fragments from each candidate materialized view have been initially selected for persistent maintenance, according to an embodiment of the invention. In FIG. 2, materialized view fragments 102A-B, 104A-B, 106A-B, and 108A-B have been selected, materialized, and persistently stored (e.g., on one or more hard disk drives). However, due to storage space constraints, fragments 102C, 104C, 106C, and 108C have not been selected, materialized, or persistently stored (these fragments might have been materialized along with the remainder of the materialized views to which they belong at one time in response to the execution of the queries that define those materialized views, but, if so, were later discarded). Thus, in one embodiment of the invention, an approximately equal number of fragments are selected from each candidate materialized view. In an alternative embodiment of the invention, when fragments differ more extremely in size, fragments may be initially selected from each candidate materialized view in a manner such that an approximately equal quantity of data from each candidate materialized view is contained within the selected materialized view fragments.

In one embodiment of the invention, when a query that corresponds to a candidate materialized view is executed, a determination is made as to whether any of the fragments of that candidate materialized view are currently selected and persistently stored. For each of the fragments of the candidate materialized view that are currently selected and persistently stored, the query results contained in that fragment are read directly from that fragment; the portion of the query that would otherwise have needed to be executed relative to the underlying data in the database in order to obtain those query results is not executed. If any of the needed query results are not stored in any currently selected and persistently stored fragment, then the portion of the query that generates those particular query results is executed relative to the underlying data in the database to generate those results only. Thus, processing time may be reduced and processing resources may be conserved.

Although materialized view fragments may be initially selected from each candidate materialized view in an egalitarian manner, such that each candidate materialized view has fairly equal representation in the number of its fragments that are actually materialized and persistently maintained, this balance may change over time due to the application of techniques described herein. Previously non-selected fragments from some candidate materialized views may be selected, materialized, and maintained, while previously selected fragments from other candidate materialized views may be unselected and discarded, as will be seen from the discussion below.

Periodically Reselecting which Materialized View Fragments to Maintain

According to one embodiment of the invention, the usage of each currently selected materialized view fragment is observed over time, and statistics are collected over time regarding the frequency of access of each currently selected materialized view fragment. At the end of each of a series of time intervals, the fragment access statistics measured during the most recent time interval (and, potentially, also the fragment access statistics measured during prior time intervals) are used to re-evaluate which fragments should be persistently maintained and which fragments should not be persistently maintained. As a result of this re-evaluation, some fragments that were currently selected during the most recent time interval might be unselected and discarded, while other fragments that were not currently selected during the most recent time interval might be selected, materialized, and persistently stored for the next time interval.

In one embodiment of the invention, after the access statistics (e.g., the number of times that a currently selected fragment was accessed during the most recent and/or all previous time intervals) for each currently selected fragment have been obtained, the currently selected fragments are ranked based on access frequencies. Currently selected fragments with higher access frequencies are ranked higher than currently selected fragments with lower access frequencies. Then, based on these rankings, a score is generated for each of the candidate materialized views. Candidate materialized views whose currently selected fragments are ranked higher than others receive a higher score, while candidate materialized views whose currently selected fragments are ranked lower than others receive a lower score. Each of the candidate materialized views is ranked by score, in a manner such that candidate materialized views with higher scores are ranked higher than candidate materialized views with lower scores.

In one embodiment of the invention, one or more candidate materialized views that are ranked the highest are granted one or more additional selected fragments for persistent maintenance and storage, while one or more candidate materialized view that are ranked the lowest lose one or more of their currently selected fragments—these newly unselected fragments cease to be persistently maintained and stored, at least until the next re-evaluation occurs. Thus, data sets (represented by candidate materialized views) that are more frequently accessed tend to increase their number of persistently maintained fragments over time, while data sets that are less frequently accessed tend to decrease their number of persistently maintained fragments over time. If a particular low-ranked candidate materialized view is chosen to decrease its number of persistently maintained fragments, then one or more of that candidate materialized views' fragments with the lowest access frequencies among that candidate materialized view's fragments may be unselected and discarded, so that the more highly accessed fragments of that candidate materialized view continue to be maintained (assuming that any fragments from that candidate materialized view remain selected after the re-evaluation). In one embodiment of the invention, the total number of currently selected fragments is kept constant throughout each re-selection of materialized view fragments. In an alternative embodiment of the invention, the total quantity of data in the currently selected fragments is kept constant throughout each re-selection of materialized view fragments.

Figure 3:
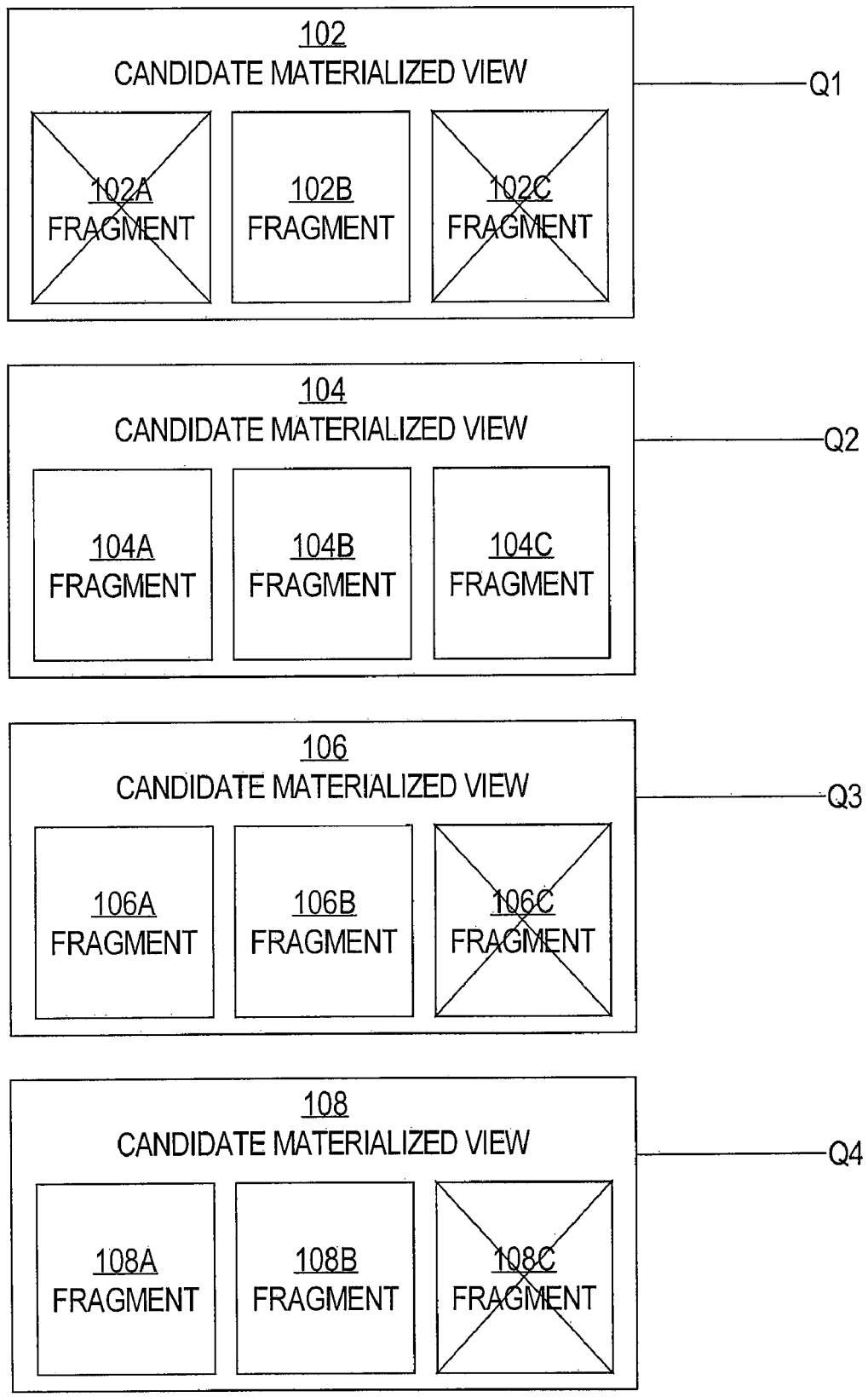
FIG. 3 is a block diagram that illustrates an example of a database in which some previously non-selected fragments have been selected for persistent maintenance, and in which some previously selected materialized view fragments have been unselected and discarded, according to an embodiment of the invention.

FIG. 3 is a block diagram that illustrates an example of a database in which some previously non-selected fragments have been selected for persistent maintenance, and in which some previously selected materialized view fragments have been unselected and discarded, according to an embodiment of the invention. In FIG. 3, materialized view fragment 104C, which was previously not selected, has been selected, materialized, and persistently stored. The selection of materialized view fragment 104C is at least partially due to the fact that currently selected materialized view fragments 104A-B, from the same candidate materialized view 104, were frequently accessed, at least during the last time interval. As a result of the materialization and persistent storage of fragment 104C, all of the fragments of candidate materialized view 104 are persistently maintained, and candidate materialized view 104 is fully and actually materialized. Additionally, in FIG. 3, materialized view fragment 102A, which was previously selected, has been unselected and discarded such that its contents are no longer persistently stored separately from the underlying data that was queried to generate that fragment. The unselection of materialized view fragment 102C is at least partially due to the fact that currently selected materialized view fragments 102A-B, from the same candidate materialized view 104, were not frequently accessed, at least during the last time interval. Fragment 102A has been unselected rather than fragment 102B at least in part because fragment 102A was less frequently accessed than fragment 102B, at least during the lat time interval. Other than the selection of previously unselected fragment 104C, and then unselection of previously selected fragment 102A, the selected/unselected state of the fragments illustrated in FIG. 3 remains the same as in FIG. 2.

In one embodiment of the invention, the quantity of currently selected fragments that are newly unselected and discarded is chosen to be the same as the quantity of currently non-selected fragments that are newly selected and persistently maintained. In an alternative embodiment of the invention, the total size of the currently selected fragments that are newly unselected and discarded is chosen to be no less than the total size of currently non-selected fragments that are newly selected and persistently maintained.

Later re-evaluations can further change which fragments are selected, materialized, and persistently stored, and which fragments are unselected and discarded. Thus, the selected/unselected state of the fragments may change over time and based on real-world changes in data access patterns. If a candidate materialized view that was formerly not frequently accessed later becomes frequently accessed, then the proportion of that candidate materialized view that is persistently maintained may increase. Conversely, if a candidate materialized view that formerly frequently accessed later becomes infrequently accessed, then the proportion of that candidate materialized view that is persistently maintained may decrease. If data access patterns do not significantly change over many consecutive time intervals, then the state of the database relative to which fragments are selected and persistently maintained will tend to converge and settle at some particular state of equilibrium.

In an embodiment described above, the access frequencies of various fragments are measured and used to select which candidate materialized views will have their proportion of persistently maintained data increased, and which candidate materialized views will have their proportion of persistently maintained data decreased. However, in alternative embodiments of the invention, access frequency is only one of several factors that are used to assign scores to currently selected fragments and the candidate materialized views to which those fragments belong. Some other factors, which are used in combination with access frequencies to generate fragment scores and candidate materialized view scores in alternative embodiments of the invention, are discussed below.

Example Factors Used to Determine Score for Currently Selected Fragment

In one embodiment of the invention, multiple factors are used in conjunction with each other to determine a score for a currently selected fragment. Such a score is used to determine whether the candidate materialized view to which the currently selected fragment belongs should have its number of selected materialized view fragments increased, decreased, or kept the same during subsequent time intervals. Such a score also may be used to determine whether or not the currently selected fragment itself should be discarded in the case that the decision is made to decrease the number of selected materialized view fragments of the candidate materialized view to which the currently selected fragment belongs.

In one embodiment of the invention, a currently selected materialized view fragment's score is determined based at least in part on (a) the amount of physical persistent storage space required to store the fragment persistently (e.g., on a hard disk drive), (b) the cost to generate and/or maintain the fragment (e.g., an amount of time and/or a quantity of processing resources that are required to execute the query, or a portion thereof, to generate the fragment from the underlying data in the database), and (c) a measurement of the utility of the fragment, which, in one embodiment, involves the frequency with which the fragment is accessed, as discussed above, and/or the amount of work that is saved by persistently storing the fragment. One approach for determining a measurement of the utility of a fragment, by comparing execution times of sub-queries executed relative to a partially-materialized view's materialized and unmaterialized fragments, is discussed above in the section titled "RANDOMLY FORMED FRAGMENTS." Because queries are forced to access underlying data that would be used to form a fragment when that fragment is not persistently maintained, some amount of work is saved by persistently maintaining that fragment so that the querying of the data underlying the fragment is avoided. When a particular fragment is used by many queries, and early on in the execution of those queries, the total amount of work saved by maintaining the fragment in a persistent manner may be significant.

Thus, for example, in embodiments in which fragments are not all the same size, fragments which occupy less storage space are favored over fragments which occupy more storage space (although storage space alone might not be conclusive of any particular fragment's score). Fragments that cost more to generate (e.g., in terms of time and/or processing resources) are favored over fragments which cost less to generate; if some fragment must be regenerated repeatedly, it is generally preferable to choose, for regeneration, a fragment that costs little to generate over a fragment that costs much to generate. Fragments with a high measure of utility are favored over fragments with a low measure of utility. For example, fragments that are frequently accessed are favored over fragments that are infrequently accessed.

In one embodiment of the invention, the three factors discussed above are multiplied and/or divided in order to derive a score for each currently selected fragment. The factors may be weighted differently in order to derive the scores. The fragments are then ranked relative to each other in the manner discussed previously. In alternative embodiments of the invention, fewer than all of these factors may be used to determine a fragment's score. In some alternative embodiments of the invention, other factors, not expressly disclosed herein, additionally or alternatively may be used to determine the score for each fragment.

Hardware Overview

Figure 4:
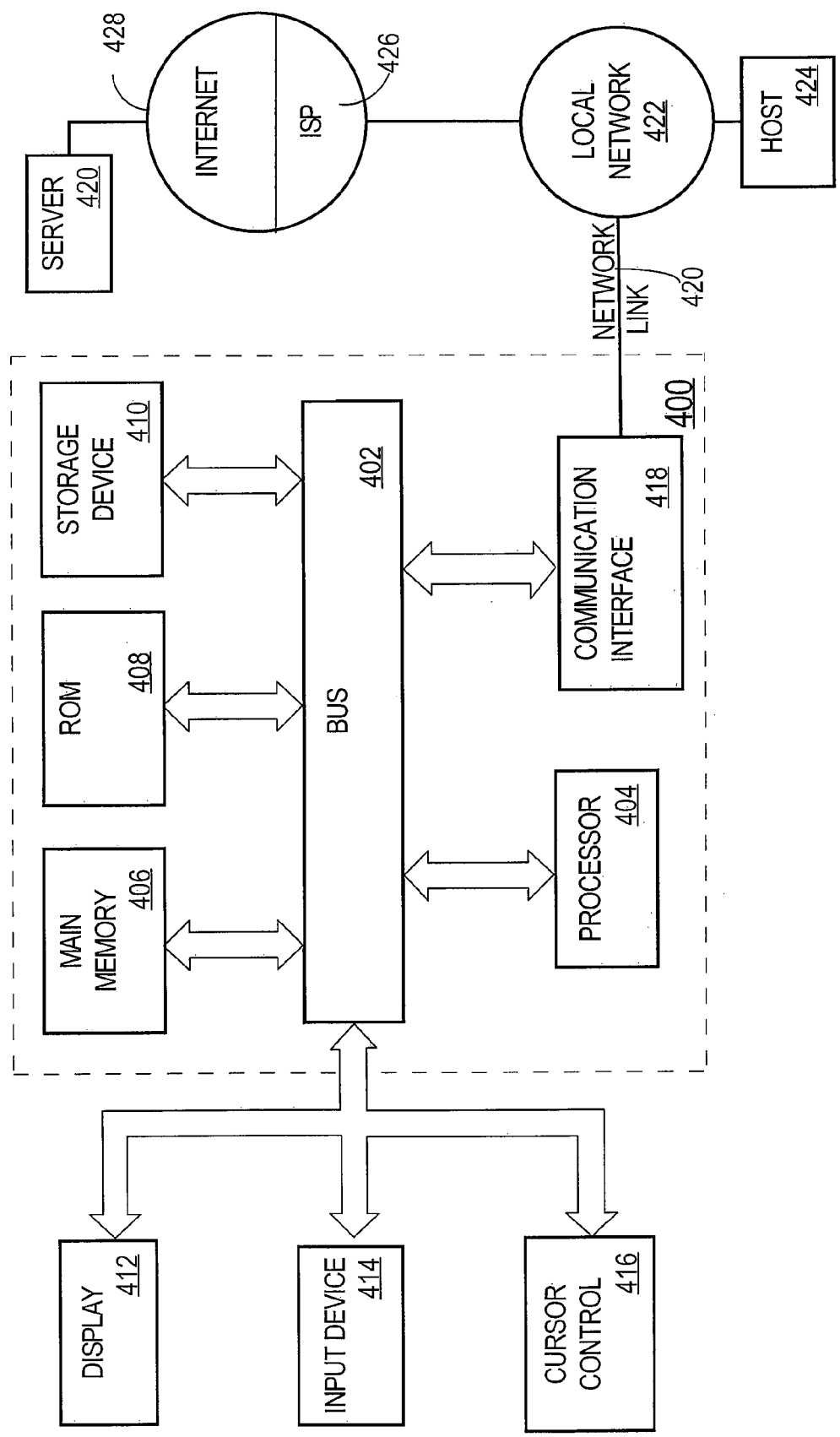
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 450 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
a hardware computer processor performing the steps comprising:
selecting two or more particular fragments of two or more candidate materialized views by selecting fewer than all of the fragments of either of the two or more candidate materialized views;
during a first time interval, storing the two or more particular fragments in one or more non-volatile computer readable storage mediums;
wherein, throughout the first time interval, fragments of the two or more candidate materialized views other than the two or more particular fragments are not stored in any non-volatile computer readable storage medium as fragments of any materialized view;
based on one or more statistics related to the two or more particular fragments, selecting one or more additional fragments that (a) are fragments of at least one of the two or more candidate materialized views and (b) during the first time interval, are not stored as fragments of any materialized view;
during a second time interval, storing the one or more additional fragments in the one or more non-volatile computer readable storage mediums;
based on the one or more statistics related to the two or more particular fragments, selecting at least one of the two or more particular fragments; and
during the second time interval, removing the at least one particular fragment from the one or more non-volatile computer readable storage mediums, thereby causing the at least one particular fragment to cease to be stored as a fragment of any materialized view during the second time interval,
wherein, a materialized view is a result set of a query that is stored in a persistent manner and consists of a plurality of fragments;
wherein, a fragment is a subset of the rows of a materialized view.

2. The method of claim 1, wherein selecting the one or more additional fragments comprises selecting the one or more additional fragments based at least in part on frequencies of access of at least one of the two or more particular fragments during the first time interval.

3. The method of claim 1, wherein selecting the one or more additional fragments comprises selecting the one or more additional fragments based at least in part on sizes of the one or more additional fragments.

4. The method of claim 1, wherein selecting the one or more additional fragments comprises selecting the one or more additional fragments based at least in part on costs of generating the one or more additional fragments from data from which the one or more additional fragments must be generated in order to produce materialized view fragments.

5. The method of claim 1, wherein selecting the one or more additional fragments based on the one or more statistics comprises:
for each particular fragment of the two or more particular fragments, measuring an access frequency of that particular fragment during the first time interval;
ranking the two or more particular fragments relative to each other based at least in part on the access frequencies measured for each of the two or more particular fragments;
selecting a highest ranked fragment from among the ranked two or more particular fragments; and
selecting, as the one or more additional fragments, one or more fragments that are part of a same candidate materialized view as the highest ranked fragment.

6. The method of claim 1, further comprising:
determining, for each particular fragment of the two or more particular fragments, a measure of utility of the particular fragment;
selecting at least one of the two or more particular fragments due at least in part to said at least one particular fragment having a lower measure of utility than measures of utility of others of the two or more particular fragments; and
during the second time interval, removing the at least one particular fragment from the one or more non-volatile computer readable storage mediums, thereby causing the at least one particular fragment to cease to be stored as a fragment of any materialized view during the second time interval.

7. The method of claim 1, further comprising:
determining, for each particular fragment of the two or more particular fragments, both (a) a measure of utility of the particular fragment, (b) a size of the particular fragment, and (c) a ratio of the measure of utility of the particular fragment to the size of the particular fragment;
selecting at least one of the two or more particular fragments due at least in part to said at least one particular fragment having a higher ratio of utility to size than ratios of utility to size of others of the two or more particular fragments; and
during the second time interval, removing the at least one particular fragment from the one or more non-volatile computer readable storage mediums, thereby causing the at least one particular fragment to cease to be stored as a fragment of any materialized view during the second time interval.

8. The method of claim 1, further comprising:
for each of the one or more additional fragments stored in the one or more non-volatile computer readable storage mediums during the second time interval, selecting another fragment from among the two or more particular fragments, thereby selecting one or more other fragments from among the two or more particular fragments; and
during the second time interval, removing the one or more other fragments from the one or more non-volatile computer readable storage mediums, thereby causing the one or more other fragments to cease to be stored as a fragment of any materialized view during the second time interval, and keeping a total number of fragments persistently stored during the second time interval the same as a total number of fragments persistently stored during the first time interval.

9. The method of claim 1, further comprising:
selecting, from among the two or more particular fragments, one or more other fragments that are no less in total size than the one or more additional fragments are in total size; and
during the second time interval, removing the one or more other fragments from the one or more non-volatile computer readable storage mediums, thereby causing the one or more other fragments to cease to be stored as a fragment of any materialized view during the second time interval, and keeping a total number of fragments persistently stored during the second time interval the same as a total number of fragments persistently stored during the first time interval.

10. The method of claim 1, further comprising:
initially forming each particular fragment of the two or more particular fragments by randomly selecting, from rows that are contained in a candidate materialized view to which the particular fragment belongs, rows to be included in that particular fragment.

11. The method of claim 10, further comprising:
receiving a request to execute a particular query relative to a particular candidate materialized view of the two or more candidate materialized views;
wherein the particular candidate materialized view comprises at least (a) a first fragment that is currently materialized and (b) a second fragment that is not currently materialized;
executing a first sub-query of the particular query relative to rows that are materialized in the first fragment;
executing a second sub-query of the particular query relative to rows that would be used to materialize the second fragment;
comparing an execution time of the first sub-query to an execution time of the second sub-query; and
based on a result of said comparing, determining a measure of utility of the first fragment;
wherein said one or more statistics include said measure of utility.

12. A volatile or non-volatile computer-readable storage medium carrying one or more sequences of instructions which, when executed by one or more processors, cause the one or more processors to perform steps comprising:
selecting two or more particular fragments of two or more candidate materialized views by selecting fewer than all of the fragments of either of the two or more candidate materialized views;
during a first time interval, storing the two or more particular fragments in one or more non-volatile computer readable storage mediums;
wherein, throughout the first time interval, fragments of the two or more candidate materialized views other than the two or more particular fragments are not stored in any non-volatile computer readable storage medium as fragments of any materialized view;
based on one or more statistics related to the two or more particular fragments, selecting one or more additional fragments that (a) are fragments of at least one of the two or more candidate materialized views and (b) during the first time interval, are not stored as fragments of any materialized view;
during a second time interval, storing the one or more additional fragments in the one or more non-volatile computer readable storage mediums;
based on the one or more statistics related to the two or more particular fragments, selecting at least one of the two or more particular fragments; and
during the second time interval, removing the at least one particular fragment from the one or more non-volatile computer readable storage mediums, thereby causing the at least one particular fragment to cease to be stored as a fragment of any materialized view during the second time interval;
wherein, a materialized view is a result set of a query that is stored in a persistent manner and consists of a plurality of fragments;
wherein, a fragment is a subset of the rows of a materialized view.

13. The computer-readable storage medium of claim 12, wherein selecting the one or more additional fragments comprises selecting the one or more additional fragments based at least in part on frequencies of access of at least one of the two or more particular fragments during the first time interval.

14. The computer-readable storage medium of claim 12, wherein selecting the one or more additional fragments comprises selecting the one or more additional fragments based at least in part on sizes of the one or more additional fragments.

15. The computer-readable storage medium of claim 12, wherein selecting the one or more additional fragments comprises selecting the one or more additional fragments based at least in part on costs of generating the one or more additional fragments from data from which the one or more additional fragments must be generated in order to produce materialized view fragments.

16. The computer-readable storage medium of claim 12, wherein selecting the one or more additional fragments based on the one or more statistics comprises:
for each particular fragment of the two or more particular fragments, measuring an access frequency of that particular fragment during the first time interval;
ranking the two or more particular fragments relative to each other based at least in part on the access frequencies measured for each of the two or more particular fragments;
selecting a highest ranked fragment from among the ranked two or more particular fragments; and
selecting, as the one or more additional fragments, one or more fragments that are part of a same candidate materialized view as the highest ranked fragment.

17. The computer-readable storage medium of claim 12, wherein the steps further comprise:
determining, for each particular fragment of the two or more particular fragments, a measure of utility of the particular fragment;
selecting at least one of the two or more particular fragments due at least in part to said at least one particular fragment having a lower measure of utility than measures of utility of others of the two or more particular fragments; and
during the second time interval, removing the at least one particular fragment from the one or more non-volatile computer readable storage mediums, thereby causing the at least one particular fragment to cease to be stored as a fragment of any materialized view during the second time interval.

18. The computer-readable storage medium of claim 12, wherein the steps further comprise:
determining, for each particular fragment of the two or more particular fragments, both (a) a measure of utility of the particular fragment, (b) a size of the particular fragment, and (c) a ratio of the measure of utility of the particular fragment to the size of the particular fragment;
selecting at least one of the two or more particular fragments due at least in part to said at least one particular fragment having a higher ratio of utility to size than ratios of utility to size of others of the two or more particular fragments; and during the second time interval, removing the at least one particular fragment from the one or more non-volatile computer readable storage mediums, thereby causing the at least one particular fragment to cease to be stored as a fragment of any materialized view during the second time interval.

19. The computer-readable storage medium of claim 12, wherein the steps further comprise:

for each of the one or more additional fragments stored in the one or more non-volatile computer readable storage mediums during the second time interval, selecting another fragment from among the two or more particular fragments, thereby selecting one or more other fragments from among the two or more particular fragments; and during the second time interval, removing the one or more other fragments from the one or more non-volatile computer readable storage mediums, thereby causing the one or more other fragments to cease to be stored as a fragment of any materialized view during the second time interval, and keeping a total number of fragments persistently stored during the second time interval the same as a total number of fragments persistently stored during the first time interval.

20. The computer-readable storage medium of claim 12, wherein the steps further comprise:

selecting, from among the two or more particular fragments, one or more other fragments that are no less in total size than the one or more additional fragments are in total size; and during the second time interval, removing the one or more other fragments from the one or more non-volatile computer readable storage mediums, thereby causing the one or more other fragments to cease to be stored as a fragment of any materialized view during the second time interval, and keeping a total number of fragments persistently stored during the second time interval the same as a total number of fragments persistently stored during the first time interval.

21. The computer-readable storage medium of claim 12, wherein the steps further comprise: initially forming each particular fragment of the two or more particular fragments by randomly selecting, from rows that are contained in a candidate materialized view to which the particular fragment belongs, rows to be included in that particular fragment.

22. The computer-readable storage medium of claim 21, further comprising:

receiving a request to execute a particular query relative to a particular candidate materialized view of the two or more candidate materialized views;

wherein the particular candidate materialized view comprises at least (a) a first fragment that is currently materialized and (b) a second fragment that is not currently materialized;

executing a first sub-query of the particular query relative to rows that are materialized in the first fragment;

executing a second sub-query of the particular query relative to rows that would be used to materialize the second fragment;

comparing an execution time of the first sub-query to an execution time of the second sub-query; and based on a result of said comparing, determining a measure of utility of the first fragment;

wherein said one or more statistics include said measure of utility.

\* \* \* \* \*